United States Patent [19]

Paillet

[11] Patent Number: 5,642,471
[45] Date of Patent: Jun. 24, 1997

[54] PRODUCTION RULE FILTER MECHANISM AND INFERENCE ENGINE FOR EXPERT SYSTEMS

[75] Inventor: Olivier Paillet, Neuilly, France

[73] Assignee: Alcatel N.V., Amsterdam, Netherlands

[21] Appl. No.: 239,386

[22] Filed: May 6, 1994

[30] Foreign Application Priority Data

May 14, 1993 [FR] France ................................ 93 05834

[51] Int. Cl.$^6$ ............................................... G06F 15/00
[52] U.S. Cl. ............................................................... 395/51
[58] Field of Search ................................... 395/51, 64, 60, 395/75; 364/513

[56] References Cited

U.S. PATENT DOCUMENTS

| | | | |
|---|---|---|---|
| 4,890,240 | 12/1989 | Loeb et al. | 364/513 |
| 5,263,127 | 11/1993 | Barabash et al. | 395/60 |
| 5,265,193 | 11/1993 | Grady et al. | 395/64 |
| 5,297,239 | 3/1994 | Kurosawa et al. | 395/75 |
| 5,353,385 | 10/1994 | Tano et al. | 395/64 |
| 5,485,549 | 1/1996 | Sakaguchi et al. | 395/51 |

FOREIGN PATENT DOCUMENTS

0314650A2   5/1989   European Pat. Off. .

OTHER PUBLICATIONS

Daniel P. Miranker, "Treat: A Better Match Algorithm for AI Production Systems", *Proc. Sixth Nat. Conf. on Artiicail Intelligence*, vol. 1, Jul. 13, 1987, pp. 42–47.

French Search Report FR 9305834 dated Dec. 14, 1993.

*Primary Examiner*—Robert Downs
*Assistant Examiner*—Sanjiv Shah
*Attorney, Agent, or Firm*—Sughrue, Mion, Zinn, Macpeak & Seas

[57] ABSTRACT

A mechanism for filtering production rules which express conditions to be satisfied, identifies during successive inference cycles rules whose conditions are satisfied for deduced facts. The mechanism includes a sorting system for ordering the conditions of the rules according to a sorting criterion in order to verify the conditions of the rules on the basis of an order in which the conditions are to be applied. The sorting mechanism activates the system for sorting the conditions of the rules only if the number of facts satisfying a rule condition is multiplied or divided by a variable factor between the current inference cycle and the last preceding inference cycle during which the sorting system was activated for that rule.

6 Claims, 2 Drawing Sheets

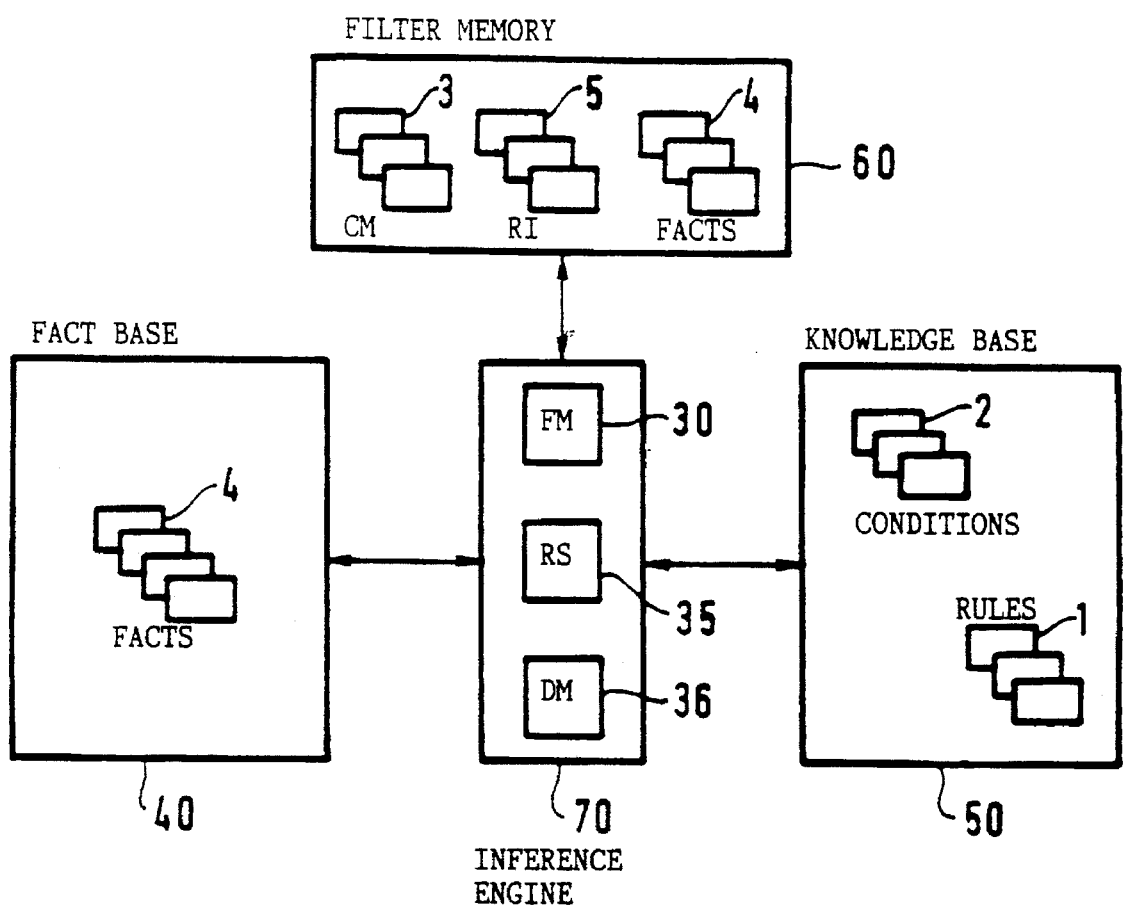
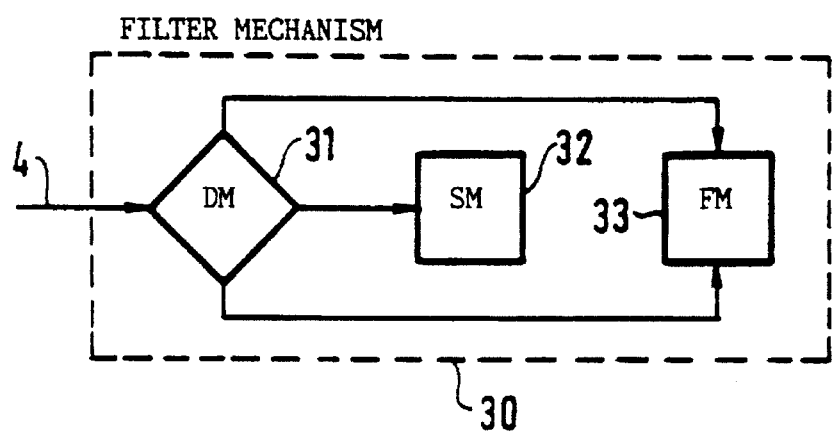

PRODUCTION RULE FILTER MECHANISM AND INFERENCE ENGINE FOR EXPERT SYSTEMS

BACKGROUND OF THE INVENTION

1. Field of the Invention

The present invention is directed to a mechanism for filtering production rules which expresses conditions to be satisfied, and for identifying during successive inference cycles rules whose conditions are satisfied for deduced facts. The mechanism includes a sorting system for ordering the conditions of the rules according to a sorting criterion in order to verify the conditions of the rules on the basis of an order in which the conditions are to be applied.

2. Description of the Related Art

A filter mechanism of this general kind is disclosed in the document TSI Vol. 5 N° 3, Jun. 1986, "Un langage déclaratif: SNARK", J. L. Laurière. This type of filter mechanism is designed primarily for computerized systems to assist in decision making, often referred to as an expert system. An expert system conventionally includes three parts, namely, a first working memory or fact base containing deduced facts, a second working memory or knowledge base containing a set of production rules each expressing one or more conditions to be satisfied in relation to one or more conclusions to be deduced, and a deduction procedure or inference engine.

Expert systems are widely used in industry, their applications including diagnosing malfunctions of an installation.

The deduction procedure is usually arranged to effect an inference cycle in three stages: filtering, resolution of conflict and inference. The filter stage entails determining the production rules whose conditions are satisfied for facts in the fact base. The conflict resolution stage entails selecting rules from the rules declared as candidates by the filter stage. The inference stage entails adding facts to, removing facts from or modifying facts in the fact base according to the conclusion(s) of the rules retained in the conflict resolution stage.

The efficacy of the filter stage has a decisive influence on the efficacy of the deduction process as it frequently uses more than 80% of the total processing time for each inference cycle.

In the above-mentioned document, the deduction procedure includes a production rule filtering mechanism including a sorting system for ordering the conditions of the rules according to a sorting criterion in order to verify the conditions of the rules on the basis of an order in which the conditions are to be applied. The sorting criterion considers the condition to be applied first, for a given rule, is that which is least often satisfied for the deduced facts. The ordering of the conditions of the rules reduces the processing time needed for the filter stage. This known filter mechanism activates the sorting system on each inference cycle. As a result a filter mechanism of this kind consumes a lot of processing time because the sorting system is itself a large consumer of processing time. Moreover, it has been determined that in 99% of inference cycles the sorting system orders the conditions of the rules in the same order (in which they are to be applied) as in the preceding cycle, because the deduced facts do not change greatly between two consecutive inference cycles. There is therefore no utility in activating the sorting system for each inference cycle. An object of the invention is to remedy this drawback.

Another filter mechanism is disclosed in the document AAAI, National Conference On Artificial Intelligence, 1987, "TREAT: a better match algorithm for AI production systems", D. P. Miranker. This filter mechanism uses a representation of the conditions of the production rules in the form of a discrimination network in which each node represents a condition model of one or more production rules. A discrimination network of this kind is particularly advantageous when the conditions of the rules contain common variables. When a condition contains n variables, the node of the network corresponding to this condition memorizes the values of the sets of n facts in the fact base which satisfy the condition. The arcs of the discrimination network represent the conjunctions defined between the conditions of the rules when writing the production rules. To determine the production rules for which all the conditions are satisfied by the facts in the fact base, the filter mechanism establishes successive conjunctions between the sets of n values memorized in the nodes of the discrimination network. The filter mechanism known from the aforementioned document includes a sorting system which partially orders the nodes in the discrimination network. This sorting system is such that, during a current inference cycle, the conjunction stage for two nodes of the discrimination network corresponding to two conditions of a production rule starts at the node corresponding to the condition implied by a new fact deduced during the inference cycle immediately preceding the current inference cycle. The order in which the nodes of the network corresponding to the other conditions of the rule are applied is exactly the same as that defined when the rule was written. It has been found that the processing time needed to make the conjunctions depends on the order in which the conjunctions between network nodes are made. This processing time can be very substantially reduced if the order of taking account of the nodes is calculated quickly for all the nodes to which the conjunction stage is relevant. Another object of the invention is to improve a filter mechanism of this kind.

SUMMARY OF THE INVENTION

To this end, the invention is directed to a mechanism for filtering production rules expressing conditions to be satisfied. The mechanism is adapted to identify during successive inference cycles rule(s) whose conditions are satisfied for deduced facts and includes a sorting system for ordering the conditions of the rules in accordance with a sorting criterion in order to verify the conditions of the rules on the basis of an order to take account of the conditions. The filter mechanism is adapted to activate the system for sorting the conditions of the rules only if the number of facts which satisfy a condition of a rule is multiplied or divided by a variable factor between the current inference cycle and the last preceding inference cycle during which the sorting system was activated for this rule.

A filter mechanism of this kind requires and uses much less time than known filter mechanisms. It can be integrated into an inference engine of an expert system used to diagnose faults in an emergency.

The sorting system is adapted to memorize, for each condition of a rule, an ordered list of the other conditions of the rule so that a memorized optimum order of taking account of the conditions of a rule can be used again during subsequent inference cycles, until this order is no longer optimal because of the modification of facts in, deletion of facts from or addition of facts to the fact base. In this event the ordered list of conditions of the rule is reorganized by the sorting system.

The rule condition sorting criterion can be defined on the basis of the renewal of facts between two successive inference cycles and allowing for the fact that some can include variables.

For this sorting criterion the first condition of the rule to be applied is that which must be verified for a new deduced fact.

The invention is further directed to an expert system inference engine including a production rule filtering mechanism of this kind.

The invention is described in detail hereinafter with reference to the drawings.

BRIEF DESCRIPTION OF THE DRAWINGS

FIG. 1 is a schematic representation of an expert system comprising a fact base, a knowledge base, a filter memory and an inference engine including a filter mechanism according to the invention.

FIG. 3 is a functional block diagram of the filter mechanism according to the invention including a sorting system.

DETAILED DESCRIPTION OF THE INVENTION

Figure 2:
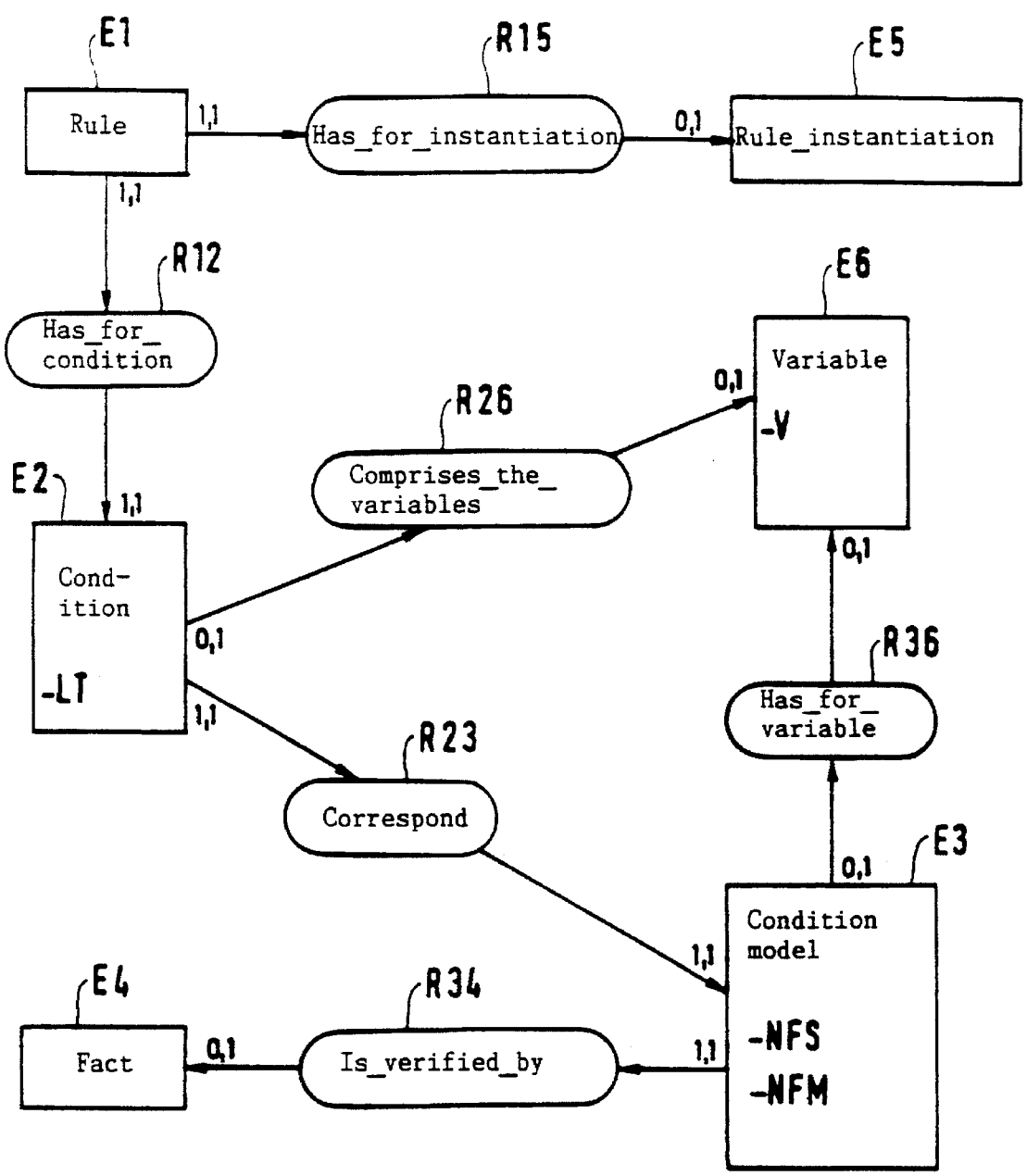
FIG. 2 is a schematic representation of the conceptual data model of the filter mechanism according to the invention.

The expert system shown in FIG. 1 is adapted to operate a computer having a keyboard to input data and a display device on which diagnosis results are displayed. This expert system includes a fact base 40 containing facts 4, a knowledge base 50 containing conditions 2 and rules 1, a filter memory 60 containing condition models (CM) 3, rule instantiations (RI) 5 and the facts 4 deduced during the last inference cycle, and an inference engine 70.

The inference engine includes the filter mechanism (FM) 30, a rule selector mechanism (RS) 35, and a deduction mechanism (DM) 36. The mechanism 35 and 36 are conventional and are not described further.

To facilitate an understanding of the invention, the conceptual data model used by the filter mechanism is described first.

Referring to FIG. 2, the conceptual model (using the relation entity formalization of the "MERISE" method) includes six entities (each denoted by the symbol E and represented by a rectangular box) and seven relations between these entities (each denoted by the symbol R and represented by an oval box). Entity E1 ("Rule") describes all the production rules of the expert system. Entity E2 ("Condition") describes all the conditions of the production rules, which can include variables identified by a name. Entity E3 ("Condition_model") represents conditions of a like nature except for the names of their variables, referred to as "ALPHA_Memory" in the document "Rete: a fast algorithm for the many pattern/many object pattern match problem" by Charles L. FORGY, Artificial Intelligence N° 19-1992. Entity E4 ("Fact") describes all the facts of the expert system. Entity E5 ("Rule_instantiation") describes a set of facts satisfying the conditions of a rule.

Relation R12 ("Has_for_condition") associates the entities E1 and E2 in which a rule can be associated with one to n conditions and a condition can be associated with one and only one rule by the converse relation. Relation R23 ("Correspond") associates entities E2 and E3 in which a condition is associated with one and only one condition model and a condition model is associated with one to n conditions by the converse relation. Relation R15 ("Has_for_instantiation") associates entities E1 and E5 in which a rule is associated with zero to n rule instantiations and a rule instantiation is associated with one and only one rule by the converse relation. Relation R34 ("Is_verified_by") associates entities E3 and E4 in which a condition model is associated with zero to n facts and a fact is associated with one and one only condition model by the converse relation. Relation R26 ("Comprises_the_variables") associates the entities E2 and E6 in which a condition corresponds to zero to n variables and a variable appears in one to n conditions by the converse relation. Relation R36 ("Has_for_variable") associates entities E3 and E6 in which a condition model corresponds to zero to n variables and a variable corresponds to one and only one condition model by the converse relation.

The relations between entities are conventionally implemented using pointers, the entities being objects of an object-oriented programming language such as C++ or structures in a function programming language such as C.

The following properties are added to the conventional properties describing these entities and relations required for operation of a conventional inference engine.

A property LT ("Sorted_list") whose value is an ordered list of conditions is added to entity E2 ("Condition").

Two properties are added to entity E3 ("Condition_model"), namely:
 the property NFS whose value is an integer equal to the number of facts satisfying this condition model;
 the property NFM whose value is an integer equal to a value of NFS memorized at a certain time.

A property V ("Values") whose value is the set of different values of the variable in question is added to entity E6 ("Variable").

Referring now to FIG. 3, the filter mechanism 30 includes a decision module (DM) 31, a sorting module (SM) 32 and a filter module proper (FM) 33.

The decision module 31 takes as input a deduced fact 4. From this fact, it recovers the corresponding condition model 3 by means of relation R34. The decision module updates the list of values V of the variables of the condition model recovered by relation R36 and then recomputes the number of facts NFS satisfying this condition model. It compares the ratio NFS/NFM to a variable threshold K previously stored. The threshold K preferably takes values between 1.5 and 2.

If 1/K<NFS/NFM<K, the decision module recovers the condition(s) corresponding to this model using the converse relation R23. For each of these conditions, if the "Sorted_list" property does not have a null value, it activates the filter module 33; otherwise it activates the sorting module 32 before activating the filter module 33.

If NFS/NFM>K or NFS/NFM<1/K, the decision module replaces the value NFM with the value NFS. From the condition model it recovers the conditions which correspond to this model using the converse relation R23. For each condition recovered it activates the sorting module 32 and then the filter module 33.

The sorting module 32 takes as input a condition 2. From this condition 2 it recovers using the converse relation R12 the rule 1 which includes this condition and from this rule it recovers using relation R12 all the conditions of this rule. It orders these conditions in a list LT of conditions using the following sorting algorithm:
 a) the first condition is the sorting module entry condition.
 b) and iteratively for all the other conditions, the next condition in the ordered list is that which satisfies one of the following criteria in the following order of preference:
  i) a condition not including any variables;
  ii) a condition including at least one variable present in a condition already written into the list of conditions;

iii) a condition including at least one variable and whose condition model recovered using relation R23 has the lowest value NFS. This value NFS is replaced by a value NFC (see below) if some variables of the condition in question are present in a condition already written into the list, these variables being referred to as "Constrained". The value NFC or number of constrained facts for this condition is obtained, for each constrained variable, by using relation R36 to recover the number of its values (cardinal number of the set of values) and then dividing NFS by the minimum of all these numbers. The sorting module 32 supplies as output an ordered list of conditions which is memorized in the property LT ("Sorted_list") of the entry condition.

The filter module 33 takes as input a rule 1 and a condition 2 of this rule. It recovers the ordered list of the conditions of the rule memorized in the property LT ("Sorted_list") of this condition. In the conventional manner described in "TREAT: a better match algorithm for AI production systems" by Daniel P. MIRANKER, National Conference of Artificial Intelligence 1987, it then computes the instantiations of rule 5 of entry rule 1 but considering the conditions in the order in which they appear in the ordered list of conditions.

There is claimed:

1. An apparatus for filtering production rules, which express conditions to be satisfied, said apparatus being adapted to identify, during successive inference cycles, rule(s) whose conditions are satisfied for deduced facts, said apparatus comprising a sorting system for ordering the conditions of the rules in accordance with a sorting criterion, wherein said sorting system is activated to sort the conditions of the rules only if the number of facts which satisfy a rule condition is multiplied or divided by a variable factor between the current inference cycle and the last preceding inference cycle during which the sorting system was activated for this rule.

2. The apparatus according to claim 1 wherein said sorting system is adapted to memorize an ordered list of the other conditions of said rule.

3. The apparatus according to claim 1, wherein the criteria for sorting the conditions of a rule comprises:

a) a first condition of the rule is one which must be verified for a new deduced fact;

b) a next condition of the rule is selected from the remaining conditions of the rule, said next condition being the one which satisfies one of the following criteria in the following order of preference:

i) a condition that does not include any variable;

ii) a condition including at least one variable present in a condition already selected;

iii) a condition including at least one variable and for which the number of constrained facts is the smallest.

4. Expert system inference engine comprising a filtering apparatus for filtering production rules which express conditions to be satisfied, said filtering apparatus being adapted to identify, during successive inference cycles, rule(s) whose conditions are satisfied for deduced facts, and said filtering apparatus comprising a sorting system for ordering the conditions of the rules in accordance with a sorting criterion, wherein said sorting system is activated to sort the conditions of the rules only if the number of facts which satisfy a rule condition is multiplied or divided by a variable factor between the current inference cycle and the last preceding inference cycle during which the sorting system was activated for this rule.

5. An expert system inference engine according to claim 4, wherein said sorting system is adapted to memorize an ordered list of the other conditions of said rule.

6. An expert system inference engine according to claim 4, wherein the criteria for sorting the conditions of a rule comprises:

a) a first condition of the rule is one which must be verified for anew deduced fact;

b) a next condition of the rule is selected from the remaining conditions of the rule, said next condition being the one which satisfies one of the following criteria in the following order of preference:

i) a condition that does not include any variable;

ii) a condition including at least one variable present in a condition already selected;

iii) a condition including at least one variable and for which the number of constrained facts is the smallest.

* * * * *